US008096483B2

(12) United States Patent
Riney

(10) Patent No.: US 8,096,483 B2
(45) **Date of Patent: *Jan. 17, 2012**

(54) AIR ANNULUS CUT OFF NOZZLE TO REDUCE STRINGING AND METHOD

(75) Inventor: John Riney, Buford, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/614,854

(22) Filed: Nov. 9, 2009

(65) Prior Publication Data

US 2010/0051638 A1 Mar. 4, 2010

Related U.S. Application Data

(63) Continuation of application No. 11/558,149, filed on Nov. 9, 2006, now Pat. No. 7,621,465.

(60) Provisional application No. 60/736,074, filed on Nov. 10, 2005.

(51) Int. Cl.
*A01G 25/09* (2006.01)
*B05B 17/00* (2006.01)

(52) U.S. Cl. ............ 239/1; 239/298; 239/292; 239/301; 239/470; 239/493; 118/325

(58) Field of Classification Search .............. 239/8, 298, 239/292, 301, 470, 493, 1; 118/325
See application file for complete search history.

(56) References Cited

U.S. PATENT DOCUMENTS 4,891,249 A 1/1990 McIntyre
4,911,956 A * 3/1990 Gabryszewski et al. ...... 427/424
4,969,602 A 11/1990 Scholl
4,970,985 A 11/1990 Slautterback
5,160,746 A 11/1992 Dodge, II et al.
5,194,115 A * 3/1993 Ramspeck et al. ............ 156/578
5,292,068 A * 3/1994 Raterman et al. ............... 239/11
5,294,459 A 3/1994 Hogan et al.
5,418,009 A 5/1995 Raterman et al.
5,421,921 A 6/1995 Gill et al.
5,429,840 A 7/1995 Raterman et al.
5,431,343 A 7/1995 Kubiak et al.
5,747,102 A 5/1998 Smith et al.
5,873,528 A 2/1999 Lewis et al.
6,270,019 B1 8/2001 Reighard
6,291,016 B1 9/2001 Donges et al.
7,028,867 B2 4/2006 Acum et al.
7,621,465 B2 * 11/2009 Riney ............................ 239/298

* cited by examiner

*Primary Examiner* — Dinh Nguyen
(74) *Attorney, Agent, or Firm* — Wood, Herron & Evans, L.L.P.

(57) ABSTRACT

A nozzle for a viscous liquid dispensing apparatus has a nozzle tip with a generally conical outer surface that tapers toward a dispensing orifice and forms an annular discharge air passage substantially parallel to the conical outer surface. Pressurized fluid is directed over the conical outer surface toward the dispensing orifice and thus, prevents viscous liquid dispensed from the dispensing orifice from being pulled back toward the nozzle tip and accumulating on the conical outer surface of the nozzle tip.

10 Claims, 1 Drawing Sheet

AIR ANNULUS CUT OFF NOZZLE TO REDUCE STRINGING AND METHOD

This application is a continuation of application Ser. No. 11/558,149 filed Nov. 9, 2006 (pending) which claims the benefit of U.S. Provisional Patent Application Ser. No. 60/736,074, filed on Nov. 10, 2005, the disclosures of which are incorporated by reference herein.

TECHNICAL FIELD

The present invention generally relates to a liquid dispenser and method for dispensing liquids and more particularly, to an improved dispensing nozzle.

BACKGROUND

Various viscous liquid dispensers have been developed for the precise placement of a liquid, for example, cold and hot adhesives, nonadhesive liquids, etc. Often, a liquid dispenser has a valve stem with a valve body on its distal end which is disposed on an upstream side of a valve seat and moved in an upstream direction to open the valve and in a downstream direction to close the valve.

For purposes of this document, the term "upstream" refers to a direction or location that is toward, or closer to, the source or liquid inlet; and "downstream" refers to a direction or location that is away, or further, from a source or liquid inlet of the dispenser. Further, conical refers to a right cone; and a right cone is defined as a three dimensional shape formed by straight lines passing through a vertex forming one end of the cone and intersecting a circle in a plane forming an opposite end of the cone. The cone may have any spacial orientation.

With viscous liquids, the liquid being dispensed may adhere to itself as well as to the surface it contacts. Thus, during a dispensing process, adhesive forces may cause the viscous liquid to adhere to metallic nozzle surfaces surrounding a dispensing orifice. Adhesion of the dispensed liquid to the nozzle surfaces and the liquid's cohesive forces may result in an elongation of the dispensed liquid that is commonly referred to as tailing or stringing. In some applications, for example, in dispensing dots of viscous liquid, it is known to provide a generally circular wall of pressurized air around the dispensed liquid dot and its stringy tail, thereby directing the stringy tail into the top of the dispensed dot as it is being deposited on a substrate surface. The pressurized air is directed in a generally conical shape around the path of the dispensed liquid, and the air converges at a point generally coincident with the expected location of the dot on the substrate surface. This cone of pressurized air may direct the stringy tail into the center of the deposited dot and thus, may prevent the stringy tail from falling onto areas of the substrate surface that are not intended to be coated.

While this known system may direct the excursion of the viscous tail of the dispensed liquid dot in a desired manner, it does not address the problem of viscous liquid that may adhere to, and accumulate on, external nozzle surfaces surrounding the nozzle orifice. Such an accumulation or collection of material on external nozzle surfaces may change or adversely affect the quality of subsequent liquid dispensing operations. Such accumulation may interfere with, and/or alter, the location of the dispensed liquid on a substrate, which may result in scrap production. Further, wiping such accumulations off the nozzle surfaces may interrupt an otherwise automatic liquid dispensing process and may create process inefficiencies.

SUMMARY

The present invention provides a liquid dispensing system that may prevent an accumulation of liquid on external surfaces around a dispensing orifice and may maintain the nozzle tip in a clean or "wiped" state. Further, nozzle tip maintenance may be reduced; and the overall quality of the liquid dispensing process may be improved. The liquid dispensing system of the present invention may be especially useful in the dispensing of viscous liquids.

In one embodiment, a nozzle for a viscous liquid dispensing apparatus has a dispensing liquid passage terminating with a dispensing orifice and a locating flange for aligning the nozzle with the viscous liquid dispensing apparatus. A nozzle tip has a generally conical outer surface that tapers toward the dispensing orifice and forms an annular discharge air passage substantially parallel to the conical outer surface. A discharge air passage directs a flow of pressurized fluid over the conical outer surface toward the dispensing orifice and thus, prevents viscous liquid dispensed from the dispensing orifice from being pulled back toward the nozzle tip and accumulating on the conical outer surface of the nozzle tip. In other aspects of the invention, the nozzle may be used in a nozzle assembly as part of a liquid dispensing apparatus and may provide a method of dispensing a viscous liquid from the liquid dispenser.

These and other objects and advantages of the present invention will become more readily apparent during the following detailed description taken in conjunction with the drawings herein.

DETAILED DESCRIPTION

Figure 1:
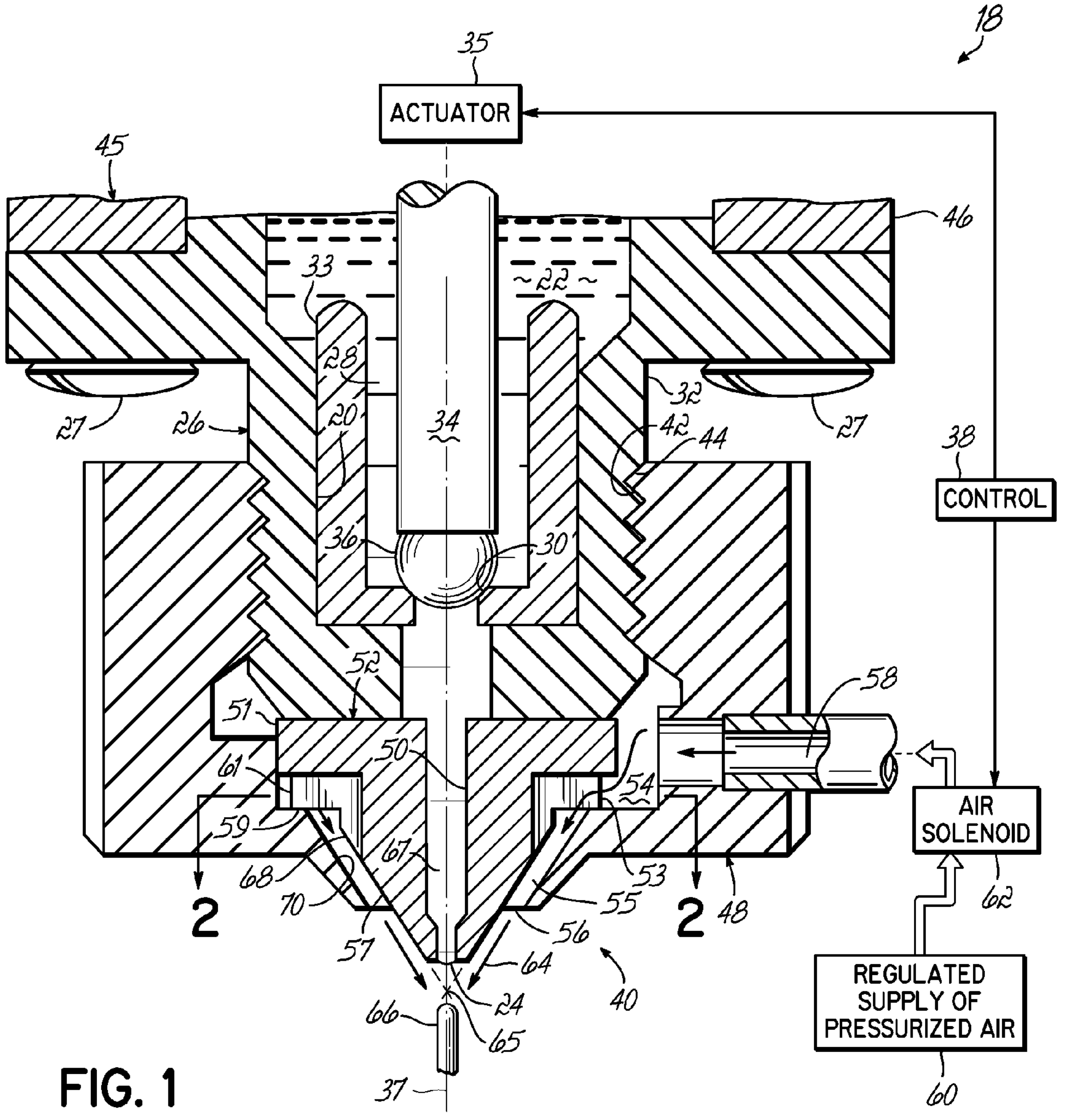
FIG. 1 is a cross-sectional view of an exemplary embodiment of a viscous liquid dispenser in accordance with an embodiment of the present invention.
Figure 2:
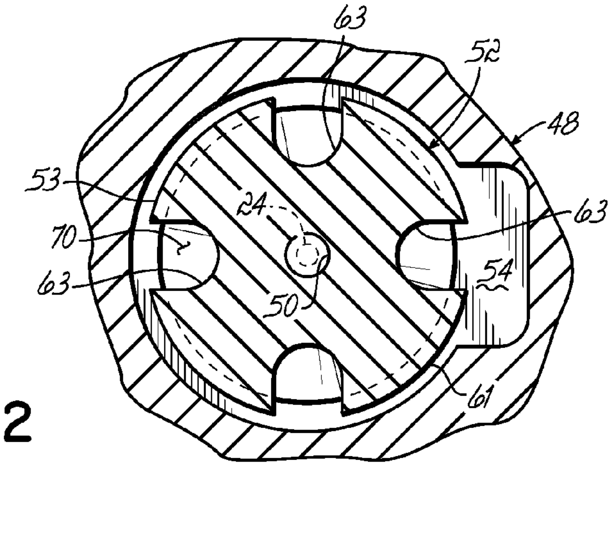
FIG. 2 is a cross-sectional view taken along line 2-2 of FIG. 1.

Referring to FIGS. 1 and 2, a viscous liquid dispensing system 18 includes a dispensing valve body 45 that has a main body portion 46 connected to a valve seat assembly 26. The valve seat assembly 26 is mounted to the main body portion 46 by fasteners 27 or other means. The valve seat assembly 26 includes a valve seat 32 with an internal bore 20 that often has a seat insert 33 press fit or otherwise secured therein. The seat insert 33 may be made of a harder material, for example, carbide, etc., to increase the useful life of the valve seat 32. The main body portion has a flow passage 22 in fluid communication with a valve seat flow passage 28 that terminates with an outlet opening 30. A vertically reciprocal valve stem 34 cooperates with the valve seat 32 at the outlet opening 30 to function as a liquid dispensing valve in a known manner.

More particularly, the valve stem 34 has a lower valve head 36 and is operable to sealingly engage a valve seat surface at the outlet opening 30, thereby closing the liquid dispensing valve. An opposite upper end (not shown) of valve stem 34 is mechanically coupled with an electric or pneumatic actuator 35, for example, a solenoid, that is operated by a control 38 in a known manner. The control operated actuator 35 provides a reciprocal movement of valve head 36 into and out of contact with valve seat 32. While valve stem 34 is illustrated with a spherical valve head 36, it will be appreciated that other valve head shapes are possible without departing from the spirit and scope of the present invention. Also, while not shown, it will be appreciated that a heating element may be disposed adjacent valve seat assembly 26 for heating a small volume of liquid or viscous material in the valve seat assembly 26 as described in detail in U.S. Pat. No. 5,747,102 the disclosure of which is incorporated herein by reference.

In this exemplary embodiment, a nozzle assembly 40 is mounted on the end of the dispensing valve body 45 and includes a nozzle 52 that is removably secured to the seat 32 by an annular air cap 48. The air cap 48 has a coupling of internal threads 42 that are engageable with external threads 44 on the valve seat 32. In other embodiments, the nozzle 52 may be differently mounted on, or made a part of, the dispensing valve body 45. For example, the nozzle 52 may be directly threaded to the dispensing valve body 45 or permanently attached to it by bonding, welding, etc. The nozzle 52 has a dispensing liquid passage 50, which is in fluid communication with the flow passage 28 through the valve seat outlet opening 30. Discharge passage 50 extends through the nozzle 52 and terminates with a dispensing orifice 24 that is generally concentrically aligned with a longitudinal centerline 37 of dispensing valve body 45.

The nozzle 52 has a mounting flange 51 that has a first diameter or width that concentrically locates the nozzle 52 inside the air cap 48 to form a nozzle and air cap assembly. A shoulder 53 is located adjacent and below the flange 51. A nozzle tip 57 is formed by a generally conical outer surface 68 that extends from the shoulder 53 and tapers linearly downward to the dispensing orifice 24. The taper of the conical outer surface 68 intersects at a point 65 that is downstream the dispensing orifice 24 and is the vertex of the conical outer surface 68. The shoulder 53 has a bearing surface 59 that cooperates with an opposing surface on the air cap 48 to secure the nozzle 52 to the end of the dispensing valve body 45. The shoulder 53 further has an outer, circumferential, generally cylindrical surface 61 that forms a generally cylindrical, annular supply air passage or plenum 54 about the nozzle 52. The plenum 54 is in fluid communication with an air inlet passageway 58 that is fluidly connected to an a solenoid 62 and regulated supply of a pressurized fluid 60, for example, air.

The generally conical outer surface 68 cooperates with an inner wall 70 of the air cap 48 to form a generally conical discharge air passage 55 that terminates with an annular air orifice 56 surrounding the dispensing orifice 24. The air passage 55 extends substantially parallel to the conical outer surface 68. The shoulder 53 has four equally spaced slots 63 around its circumference, which provide fluid communication between the plenum 54 and the discharge air passage 55. The air passage 55, air discharge orifice 56 and dispensing orifice 24 are also generally co-axially aligned with the centerline 37.

In the illustrated exemplary embodiment, the width of the air passage 55 between the outer surface 68 and the inner wall 70 is about 0.004 inch; however, in other embodiments, the width of the air passage 55 may be in a range of about 0.002-0.10 inch. Further, the air passage 55 has a conical shape and angle with respect to a centerline 37 that is substantially similar to the conical shape and angle of the nozzle tip outer surface 68. In addition, the regulated air supply 60 provides the air at a relatively low pressure, for example, in a range of about 1-2 pounds per square inch (“psi”). In other embodiments, the regulated air supply 60 may provide the air in a range of about 3-10 psi. Thus, the air passage 55 provides a lower pressure, conical layer of air or an air curtain indicated by the arrows 64, that is directed substantially parallel to the nozzle tip outer surface 68. Further, the conical layer of air 64 converges to a point 65 that is downstream of the dispensing orifice 24.

The size, shape and angle of the air passage 55 and the pressure of the air supply 60 are determined experimentally and chosen, so that the conical layer air 64 is effective to minimize a tendency of the dispensed liquid to accumulate on the nozzle tip 57 but is not obtrusive to the viscous liquid dispensing process. That is, the flowing conical layer of air 64 wipes substantially all of the conical outer surface 68 around the dispensing orifice 24 while not noticeably affecting the liquid dispensing process and hence, does not change a path of flight of the viscous liquid being dispensed from the nozzle 52. Therefore, the flowing conical layer of air 64 does not atomize the dispensed liquid, cause the dispensed liquid to form droplets, intentionally shape the leading or trailing edges of the dispensed liquid or intentionally shape the dispensed liquid deposit on the substrate. Dispensed viscous liquid is more likely to accumulate on the nozzle tip at the end of a dispensing cycle when there is more of a tendency for a residual string or tail of dispensed viscous liquid to pull back toward, and accumulate on, the nozzle tip 57. The volume of the discharge air passage 55 may be adjusted by changing the thickness of the shoulder 53 on the nozzle 52.

In operation, the control 38 operates the air solenoid 62 to provide a flow of pressurized air into the plenum 54, through the slots 63, through the air passage 55 and out the air orifice 56. A constant, unobtrusive, conical curtain or layer of air 64 flows around the conical nozzle tip 57 and dispensing orifice 24. In the illustrated closed state of the dispensing system 18, the state of the actuator 35 places the valve head 36 in contact with the valve seat 32, thereby preventing a flow of viscous liquid from the passage 28 into the discharge passage 50. To initiate a dispensing operation, the liquid dispensing valve is opened by the control 38 switching the state of the actuator 35, thereby causing the valve head 36 to lift off of the valve seat 32 in a known manner. Thus, viscous liquid flows from the flow passage 28, into the discharge passage 50 and through dispensing orifice 24.

To end a dispensing cycle and a flow of the viscous liquid through the dispensing orifice 24, the control 38 again switches the state of the actuator 35, thereby causing the valve head 36 to be moved back into contact with the valve seat 32. The return motion of the valve stem 34 and valve head 36 into contact with the valve seat 32 is often powered by a return spring (not shown) in a known manner. Upon the dispensing valve being closed and flow through the dispensing orifice 24 terminated, the conical air curtain 64 facilitates a clean break and separation between viscous liquid 67 in the discharge passage 50 and a residual string 66 of the dispensed liquid. The air curtain 64 prevents the adhesive forces in the residual string 66 from pulling the residual string toward the dispensing orifice 24 and accumulating on the nozzle tip 57.

In the absence of the conical layer of air flow 64, at the end of a dispensing cycle, the viscous nature of the liquid being dispensed may cause some of the residual string 66 to move back toward, and pool on, the nozzle tip 57. An accumulation of the dispensed viscous liquid on the nozzle tip 57 near the dispensing orifice 24 may change, and/or alter, the location of the dispensed liquid on a substrate. In some applications, the accumulation of dispensed viscous liquid on the nozzle tip 57 may result in scrap production. Wiping off such accumulations may interrupt an otherwise automatic process, which may create process inefficiencies.

By preventing an accumulation of adhesive on the dispensing tip, the conical air flow 64 may effectively maintain the nozzle tip 57 in a clean or “wiped” state. Thus, any problems resulting from such accumulations of dispensed viscous liquid may be substantially eliminated. Further, nozzle tip maintenance may be reduced; and the overall quality of the liquid dispensing process may be improved.

While the present invention has been illustrated by a description of various embodiments and while these embodiments have been described in considerable detail, there is no intention to restrict or in any way limit the scope of the appended claims to such detail. Additional advantages and modifications will readily appear to those skilled in the art. For example, in the exemplary embodiment of the FIG. 1, the flow of air through the discharge air passage 55 continues between dispensing cycles and further, is generally continuously maintained while power is applied to the liquid dispensing system 18. However, in alternative embodiments, the flow of pressurized air through the discharge passage 55 may be terminated between dispensing cycles.

Further, in the exemplary embodiment of FIG. 1, the air passage 55 is described as having a particular size, shape and angle; and a range of air pressure from the supply 60 is identified. In any particular embodiment, the size, shape and angle of the air passage 55 and the pressure of the air supply 60 are determined experimentally and chosen, so that the conical air curtain 64 does not interfere with the liquid dispensing operation but is effective to keep the residual string from pulling back toward the nozzle tip at the end of a liquid dispensing cycle. Further, the air passage 55 is shown and described as an uninterrupted annular air passage. However, in alternative embodiments, the air passage may be made from arcuate segments, a locus of holes or other passages that is effective to keep the residual string from pulling back toward the nozzle tip at the end of a liquid dispensing cycle.

Therefore, the invention in its broadest aspects is not limited to the specific details shown and described. Consequently, departures may be made from the details described herein without departing from the spirit and scope of the claims which follow.

What is claimed is:

1. A method for dispensing a viscous liquid from a dispensing nozzle of a liquid dispenser over successive liquid dispensing cycles, a dispensed viscous liquid having a tendency at an end of a dispensing cycle to be pulled back toward, and accumulate on, a nozzle tip of the dispensing nozzle, the method comprising:

forming a discharge fluid passage between a substantially conical outer surface of the nozzle tip and a substantially conical inner surface of a cap securing the dispensing nozzle to the liquid dispenser;

supplying a pressurized fluid to the discharge fluid passage;

producing with the discharge fluid passage a substantially conical layer of pressurized fluid surrounding the nozzle tip; and wiping the nozzle tip with the substantially conical layer of pressurized fluid while the viscous liquid is being dispensed, the pressurized fluid being supplied at a pressure such that the pressurized fluid does not substantially change a path or flight of the dispensed viscous liquid but substantially minimizes a tendency of the dispensed viscous liquid to pull back toward, and accumulate on, the nozzle tip.

2. The method of claim 1, wherein wiping the conical outer surface of the nozzle with the substantially conical layer of pressurized fluid does not induce any of the following: atomizing the dispensed liquid, causing the dispensed liquid to form droplets, and shaping the dispensed liquid prior to deposit on a substrate.

3. The method of claim 1 wherein supplying a pressurized fluid further comprises continuously supplying the pressurized fluid during and between liquid dispensing cycles.

4. The method of claim 1 wherein supplying a pressurized fluid further comprises supplying the pressurized fluid at a pressure in a range of about 1-2 pounds per square inch.

5. The method of claim 1 wherein supplying a pressurized fluid further comprises supplying the pressurized fluid at a pressure in a range of about 0.5-5 pounds per square inch.

6. The method of claim 1, wherein the dispensing nozzle includes a discharge passage leading to a dispensing orifice at the nozzle tip, and wiping the conical outer surface of the nozzle tip with the substantially conical layer of pressurized fluid further comprises:

facilitating a clean break or separation between viscous liquid in the discharge passage and any residual strings of the dispensed liquid at the termination of each liquid dispensing cycle.

7. The method of claim 1, wherein the liquid dispenser includes a valve seat assembly, and the method further comprises:

coupling the cap to the valve seat assembly such that the nozzle is trapped into engagement with the cap and the valve seat assembly.

8. The method of claim 7, wherein the nozzle includes a mounting flange, and coupling the cap to the valve seat assembly further comprises:

engaging the mounting flange with the cap so that the nozzle is coaxial with the valve seat assembly and the cap.

9. The method of claim 8, wherein the nozzle further includes a shoulder adjacent the mounting flange, and coupling the cap to the valve seat assembly further comprises:

positioning the shoulder onto the cap so as to support the nozzle with the cap.

10. The method of claim 9, wherein the nozzle includes an upper surface, the cap includes internal threads, and the valve seat assembly includes external threads, and coupling the cap to the valve seat assembly further comprises:

engaging the internal threads of the cap with the external threads of the valve seat assembly to push the upper surface of the nozzle into contact with the valve seat assembly.

* * * * *

UNITED STATES PATENT AND TRADEMARK OFFICE

CERTIFICATE OF CORRECTION

PATENT NO. : 8,096,483 B2
APPLICATION NO. : 12/614854
DATED : January 17, 2012
INVENTOR(S) : John Riney It is certified that error appears in the above-identified patent and that said Letters Patent is hereby corrected as shown below:

Column 6

Line 7, in claim 2 after "nozzle" insert --tip--.

Signed and Sealed this
Sixth Day of March, 2012

David J. Kappos
*Director of the United States Patent and Trademark Office*